United States Patent [19]

Larsen

[11] Patent Number: 4,496,097
[45] Date of Patent: Jan. 29, 1985

[54] AUTOMATIC BELLOWS WELDER AND METHOD FOR USING SAME

[75] Inventor: Richard R. Larsen, Daytona Beach, Fla.

[73] Assignee: Pacific Scientific Company, Anaheim, Calif.

[21] Appl. No.: 619,776

[22] Filed: Jun. 11, 1984

Related U.S. Application Data

[62] Division of Ser. No. 313,283, Oct. 21, 1981.

[51] Int. Cl.$^3$ .............................................. B23K 37/04
[52] U.S. Cl. ...................................... 228/212; 29/454
[58] Field of Search ............. 29/454; 228/212, 44.1 R

[56] References Cited

U.S. PATENT DOCUMENTS

| | | | |
|---|---|---|---|
| 2,347,185 | 4/1944 | Fentress | 29/454 X |
| 3,260,438 | 7/1966 | Bergantini | 228/44.1 RX |
| 3,270,905 | 9/1966 | Kroekel | 29/454 X |
| 3,777,210 | 11/1973 | Keller | 228/212 X |
| 4,133,470 | 1/1979 | Trail | 228/212 X |

Primary Examiner—Kenneth J. Ramsey
Attorney, Agent, or Firm—James A. Hudak

[57] ABSTRACT

A device for welding thin metallic diaphragms which can be combined to form a bellows arrangement and method for using same is disclosed. The device uses a pair of weld spools (22), in a spaced apart relationship, each having a circumferential groove (26) formed therein to receive the surfaces defining the inside diameters of the diaphragms. A pressure roller (20) is provided and has a plurality of circumferential grooves (28) formed therein, the axial spacing between the circumferential grooves (28) approximating the desired pitch of the resulting diaphragm convolution. Each of the circumferential grooves (28) receives a surface defining the outside diameter of a diaphragm and pressure is applied thereto by the pressure roller (20). Rotation of the pressure roller (20) and the pair of weld spools (22) by their respective drive shafts (42,32) causes the diaphragms to rotate about their axes permitting a welding torch (50) to weld the surfaces defining the inside diameters of the diaphragms.

3 Claims, 7 Drawing Figures

U.S. Patent   Jan. 29, 1985   Sheet 1 of 2   4,496,097
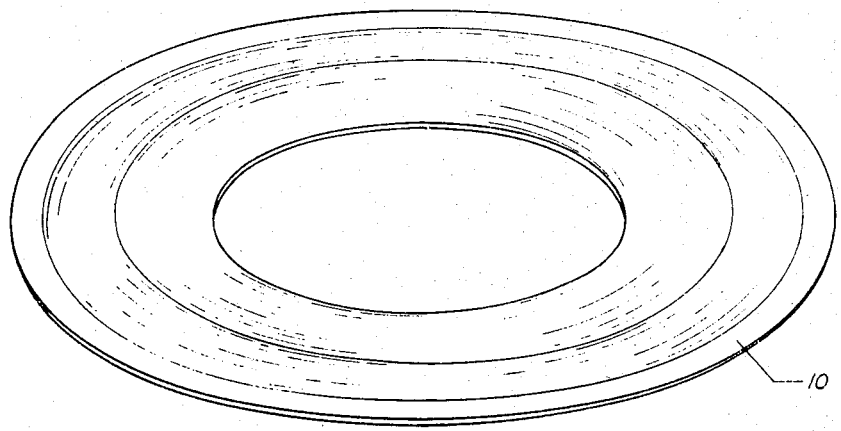
FIG. 1
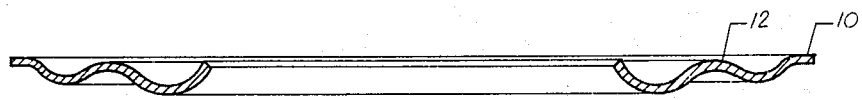
FIG. 1A
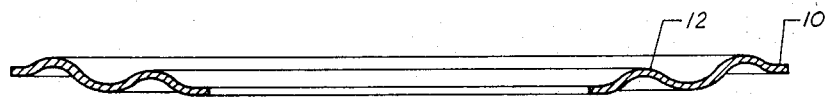
FIG. 1B
FIG. 1C
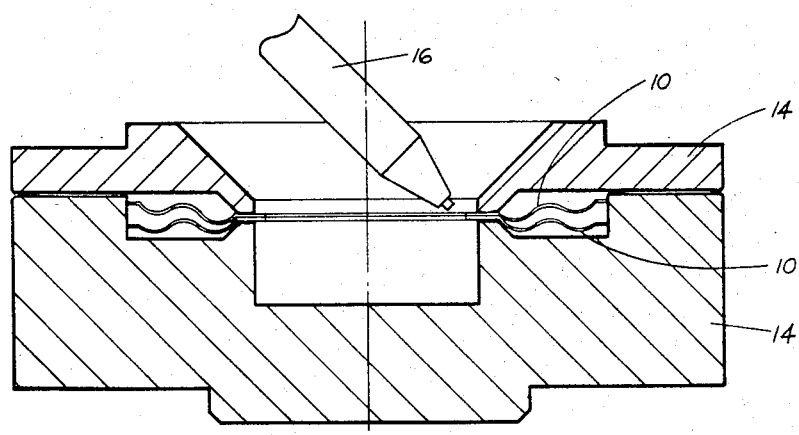
PRIOR ART   FIG. 2

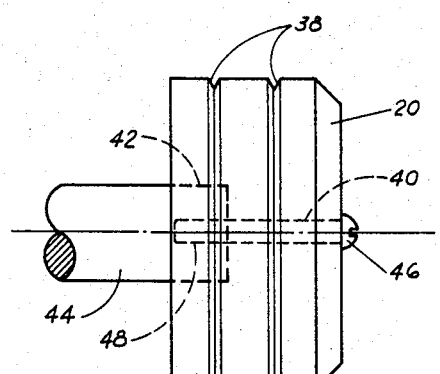
FIG. 3
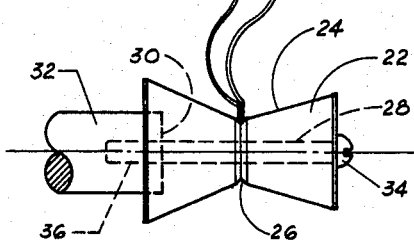
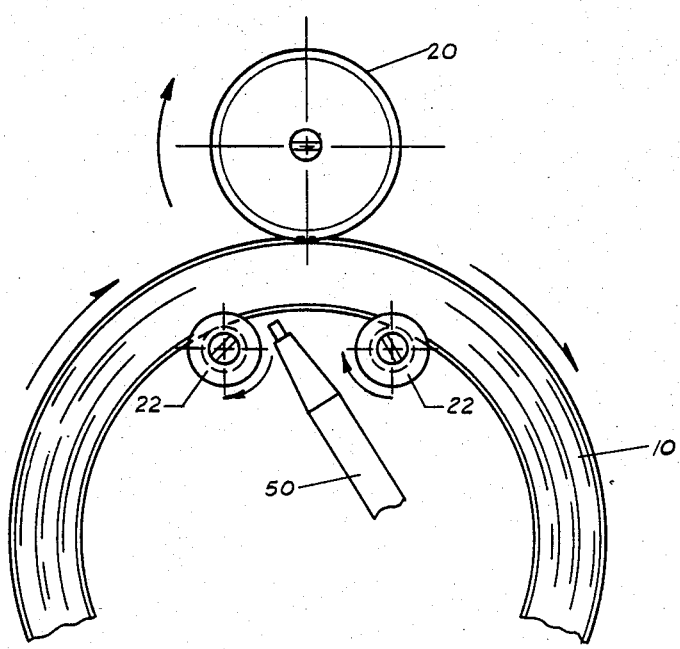
FIG. 4

4,496,097

AUTOMATIC BELLOWS WELDER AND METHOD FOR USING SAME

This is a division of application Ser. No. 313,283, filed Oct. 21, 1981.

TECHNICAL FIELD

This invention generally relates to a device for welding metallic objects and more particularly to a device for welding thin metallic diaphragms which subsequently can be combined to form a bellows arrangement.

BACKGROUND ART

Welded metal bellows are used in many applications such as pressure sensors, volume compensators, rod or shaft seals, torque couplings and flexible joints. These metal bellows are typically formed from a plurality of thin metallic ring shaped diaphragms which are welded together. Generally, the welding process has two steps—the welding together of two diaphragms forming a convolution, and the stacking of the resulting convolutions and the welding of same to form a bellows arrangement. The prior art method relative to the first step, i.e., the welding together of two diaphragms, requires the use of a fixturing device to hold the diaphragms in intimate contact and alignment while the surfaces defining the inside diameters of the diaphragms are welded. This approach has inherent disadvantages in that the weld speed is relatively slow, the fixturing device must be custom built for each diaphragm design, the fixturing is costly and requires extensive storage space, tooling changeover time is excessive, and the fixturing is generally fabricated from a soft metal which can be nicked or gouged resulting in substantial rework charges.

Because of the foregoing, it has become desirable to develop apparatus for welding thin metallic diaphragms wherein the resulting fixturing, in addition to being simple and relatively inexpensive, can be used for many sizes of diaphragms, does not require extensive storage space, requires minimal changeover time, and is fabricated from a material that does not easily become nicked or gouged, thus minimizing any tooling rework required.

SUMMARY OF THE INVENTION

The present invention solves the aformentioned problems associated with the prior art as well as other problems by providing apparatus to weld a pair of thin metallic ring shaped diaphragms prior to their subsequent assembly into a bellows arrangement. This is accomplished by providing a pair of welding spools positioned in a spaced apart relationship and each having a V-shaped circumferential groove located generally centrally therein. A pressure roller is located generally centrally between and parallel to the welding spools so that the welding spools and the pressure roller are arranged in a triangular array. The pressure roller is mounted on a swing arm and has two V-shaped circumferential grooves on the outer surface thereof. The axial spacing between the two grooves approximates the desired pitch of the resulting diaphragm convolution. A pair of diaphragms to be welded is received on the welding spools so that the surfaces defining the inside diameters of the diaphragms are received in the V-shaped grooves provided thereon. The pressure roller is then lowered and engages the diaphragms so that the surfaces defining the outside diameter of each diaphragm is received in one of the two V-shaped grooves in the pressure roller. The welding spools and the pressure roller are then caused to rotate causing the diaphragms to rotate about their colinear axis. While this is occurring, a welding torch, positioned between the welding spools, is actuated, welding the surfaces defining the inside diameters of the diaphragms.

BRIEF DESCRIPTION OF THE DRAWINGS

FIG. 1 is a perspective view of a typical ring shaped metallic diaphragm.

FIGS. 1A through 1C are typical cross-sectional views of various diaphragms.

FIG. 2 is a cross-sectional view of the ring-clamp (prior art) method for welding diaphragms.

FIG. 3 is a front elevation view illustrating the position of the pressure roller relative to the welding spools and the engagement of a pair of diaphragms therewith.

FIG. 4 is a side elevation view of the pressure roller and the welding spools illustrated in FIG. 3 and shows their orientation relative to one another.

DESCRIPTION OF THE PREFERRED EMBODIMENT

Referring now to the drawings where the illustrations are for the purpose of describing the preferred embodiment of the present invention and are not intended to limit the invention thereto, FIG. 1 shows a metallic ring shaped diaphragm 10 formed from a weldable alloy, such as stainless steel, nickel base steel, high permeability steel, titanium alloys or the like. The resulting diaphragm is usually 0.002–0.010 inch thick, has an inside diameter between 0.090–19.00 inches, and has an outside diameter of between 0.230–20.00 inches. These diaphragms take various configurations such as those shown in FIGS. 1A through 1C. For example, FIG. 1A illustrates a typical cross-sectional view through a diaphragm which has a coned inner diameter, whereas in FIGS. 1B and 1C the diaphragm has a straight inner diameter form. In any case, diaphragms typically have one or more shallow circumferential ripples 12 across their surface.

In the manufacture of welded metal bellows, it is a common practice to first join pairs of ring shaped diaphragms by fusion welding the surfaces defining their inner diameters together, the welded pair then being referred to as a convolution. In an additional operation, a number of convolutions can be stacked together and the surfaces defining their outside diameters welded together to form a bellows. The invention of this disclosure concerns itself only with the first operation, viz., the joining together of pairs of diaphragms and the welding of same to form a convolution.

The prior art approach to welding these diaphragms utilizes a fixturing technique, as shown in FIG. 2, to hold these diaphragms during the welding process. This process requires the use of a pair of ring-shaped clamps 14 to hold the diaphragms in intimate contact and alignment during the welding process. These clamps are also used to rotate the diaphragms with respect to the welding torch 16 and provide chill so as to prevent excessive melting of the surfaces defining the inside diameter of the diaphragms. In addition, these clamps provide a return electrical current path for the welding arc. The primary advantage of this approach to welding the diaphragms is that adequate clamping force is always available to keep the diaphragms in intimate contact during the welding process. However, as previously stated, this approach has numerous disadvantages in that the ring clamps must be custom built for each convolution design; the clamps are costly and add to manufacturing lead time; the clamps require substantial storage space; a tooling changeover time of from 20 to 30 minutes is required to switch from one ring clamp set to another; and the clamps are usually fabricated from copper or brass for good thermal conductivity and are easily nicked resulting in substantial rework costs.

The invention of this disclosure is shown in FIG. 4 and is comprised of a pressure roller 20, and two weld spools 22 all having parallel axes and arranged in a triangular array. The weld spools 22 have a cylindrical configuration as shown in FIG. 3, the central portion of each spool having a smaller diameter than its end position and having concentric lead-in surfaces 24 from the end portions to the central portion terminating in a V-shaped circumferential groove 26. Each of the weld spools 22 has a bore 28 provided therein terminating in a counterbore 30 which receives the end of a drive shaft 32. A fastener 34 is received through the bore 28 and is received in a threaded bore 36 provided in the end of the drive shaft 32 thus securing the weld spool 22 to the drive shaft 32. The pressure roller 20 has a cylindrical configuration and has a plurality of V-shaped circumferential grooves 38 on the outer surface thereof. The axial spacing between the grooves 38 is approximately equal to the desired pitch of the resulting convolution formed by the diaphragm weldment. In addition, the pressure roller 20 has a bore 40 provided therein terminating in a counterbore 42 which receives the end of a drive shaft 44. A fastener 46 is received through the bore 40 and is received in a threaded bore 48 provided in the end of the drive shaft 44 securing the pressure roller 20 to the drive shaft 44. The pressure roller 20 and the drive shaft 44 are connected to a swing arm (not shown) allowing the pressure roller 20 to be movable relative to the weld spools 22, permitting easy loading of the device while ensuring that the axes of the pressure roller 20 and the welding spools 22 always remain parallel. In addition, a welding torch 50 is provided adjacent the weld spools 22 to weld the diaphragms, as will be hereinafter described. The welding torch 50 may be of the tungsten inert gas (T.I.G.) type provided with a nonconsumable electrode suitable for welding together metals such as stainless steels, nickel base alloys, high permeability steels, titanium alloys or the like. The electrode of the torch 50 is aligned with the seam of the two diaphragms to be joined during the welding process, as will be hereinafter described.

In order to operate the device, the pressure roller 20 is moved away from the weld spools 22 providing additional clearance therebetween. A male and a female diaphragm 10 are then loaded either manually or by automatic means into the device so that the surfaces defining their inside diameters engage each other and are received in the V-shaped groove 26. The pressure roller 20 is then moved downwardly towards the diaphragms 10 and engages the diaphragms so that the surface defining the outside diameter of each diaphragm is received in one of the V-shaped grooves 38 provided in the pressure roller 20. The spring mechanism (not shown) acting on the swing arm causes the pressure roller 20 to apply a constant pressure against the diaphragms across their span forcing them into the V-shaped groove 26 in the weld spools 22 and ultimately against each other at the surfaces defining their inside diameters.

After loading of the diaphragms 10 into the device, rotation is imparted to the weld spools 22 and the pressure roller 20 via their drive shafts 32, 44, respectively, causing the two diaphragms 10 to move between the weld spools 22 and the pressure roller 20 and to rotate about their colinear axis. The welding torch 50 is positioned to aim at the surfaces defining the inside diameters of the diaphragms, which are being held in intimate contact by the force applied by the pressure roller 20, and is then actuated welding same. When the welding arc is initiated, electron current flow is from the welding torch 50 to the diaphragms 10, welding the surfaces defining the inside diameters of the diaphragms together, then through the diaphragms 10 to the weld spools 22, through the weld spools 22 to (and through) the drive shafts 32 rotating them, through electrical brushes (not shown) in contact with the drive shafts, to a ground connection that completes the circuit to the welder power supply.

After the welding process has been completed, rotation of the pressure roller 20 and the weld spools 22 ceases, which causes the welded diaphragm convolution to cease rotating. The pressure roller 20 is then moved away from the weld spools 22 allowing removal of the welded convolution from the device.

From the foregoing, it is apparent that this invention provides the following advantages previously cited as being provided by the prior art, viz., it holds the diaphragms in intimate contact and concentric alignment during the welding process, it rotates the diaphragms with respect to the welding torch, and it provides a return electrical path for the welding arc. It does not provide for chill to prevent melting of the surfaces defining the inside diameters of the diaphragms, however, it has been found that by this method of fixturing, combined with appropriate weld speed and current control, chill can be eliminated. In addition, use of this invention has resulted in an increase in weld speed of from four to six times over that realized with the ring-clamp method. Also, very little custom tooling is required with this welding method, e.g., it appears as if the number of weld spools and pressure rollers will be minimal for a full range of diaphragm sizes. Furthermore, the weld spools and the pressure rollers can be machined from tool steel and hardened and thus are relatively inexpensive to fabricate and are not susceptible to nicking or gouging as are the ring clamps. In addition, the clamping forces utilized are significantly less (less than 15 pounds for this invention versus in excess of 200 pounds for the ring-clamp method) resulting in less safety devices being required by this method. And lastly, with this method, changing from one convolution configuration to another requires less than five minutes to complete, and the overall layout of this system makes it much easier to adapt to automated loading and unloading than does the ring-clamp method.

Certain modifications and improvements will occur to those skilled in the art upon reading the foregoing. It should be understood that all such modifications and improvements have been deleted therein for the sake of conciseness and readability, but are properly within the scope of the following claims.

I claim:

1. A method for welding together thin metallic objects each having an aperture therein comprising placing the surfaces defining the apertures in the thin metallic objects in contacting relationship with each other, rotatably engaging the outer surfaces of the thin metallic objects, rotatably engaging the surfaces defining the apertures in the thin metallic objects, and welding the contacting surfaces defining the apertures in the thin metallic objects during the rotation thereof.

2. The method as defined in claim 1 wherein the thin metallic objects are rotated about a fixed axis.

3. The method as defined in claim 1 wherein the thin metallic objects are securely held in a fixed path of rotation along their outer surfaces and the surfaces defining the apertures therein.

* * * * *